United States Patent
Gafsi et al.

(10) Patent No.: US 9,581,742 B2
(45) Date of Patent: Feb. 28, 2017

(54) MONOLITHIC, LINEAR GLASS POLARIZER AND ATTENUATOR

(71) Applicant: CORNING INCORPORATED, Corning, NY (US)

(72) Inventors: Rachid Gafsi, Horseheads, NY (US); Jue Wang, Fairport, NY (US)

(73) Assignee: Corning Incorporated, Corning, NY (US)

( * ) Notice: Subject to any disclaimer, the term of this patent is extended or adjusted under 35 U.S.C. 154(b) by 413 days.

(21) Appl. No.: 14/069,789

(22) Filed: Nov. 1, 2013

(65) Prior Publication Data
US 2014/0139910 A1    May 22, 2014

Related U.S. Application Data

(60) Provisional application No. 61/728,482, filed on Nov. 20, 2012.

(51) Int. Cl.
*G02B 5/30* (2006.01)
*G02B 1/11* (2015.01)
(Continued)

(52) U.S. Cl.
CPC .............. *G02B 5/3025* (2013.01); *G02B 1/11* (2013.01); *G02B 1/115* (2013.01); *G02B 5/208* (2013.01);
(Continued)

(58) Field of Classification Search
CPC ....... G02B 5/3025; G02B 1/115; G02B 1/116; G02B 5/20; G02B 5/208; G02B 5/22; G02B 5/226; G02B 5/3041; G02B 5/3058; G02B 5/282; G02F 1/093; C03C 17/36; G03F 7/70958
(Continued)

(56) References Cited

U.S. PATENT DOCUMENTS 5,021,100 A * 6/1991 Ishihara .......... H01L 31/022466
                                              136/249
7,465,681 B2    12/2008 Hart et al.
(Continued)

FOREIGN PATENT DOCUMENTS

| EP | 2381280 A1 | 10/2011 | ............... G02B 5/20 |
| JP | 2009217176 | 9/2009 | |
| JP | 2009217177 | 9/2009 | |

OTHER PUBLICATIONS

Machine Translation JP2009217176.
(Continued)

*Primary Examiner* — Pascal M Bui-Pho
*Assistant Examiner* — Alberto Betancourt
(74) *Attorney, Agent, or Firm* — Kevin L. Bray (57) ABSTRACT

The disclosure is directed to an element that is capable of acting as both an optical polarizer and an optical attenuator, thus integrating both functions into a single element. The element comprises a monolithic or one piece glass polarizer (herein also call the "substrate"), a multilayer "light attenuation or light attenuating" ("LA") coating that has been optimized for use at selected wavelengths and attenuations deposited on at least one polarizer facial surface, and a multilayer anti-reflective (AR) coating on top of the LA coating. The disclosure is further directed to an integrated optical isolator/attenuator comprising a first and a second polarizing elements and a Faraday rotator for rotating light positioned after the first polarizing element and before the second polarizing element, the integrated optical isolator/attenuator both polarizing and attenuation a light beam from a light source.

8 Claims, 7 Drawing Sheets

10   12   14

(51) Int. Cl.
*G02B 1/115* (2015.01)
*G02B 5/20* (2006.01)
*G02B 5/22* (2006.01)

(52) U.S. Cl.
CPC .............. *G02B 5/22* (2013.01); *G02B 5/3058* (2013.01); *G02B 5/205* (2013.01)

(58) Field of Classification Search
USPC ....... 359/352, 484.1, 350, 359, 360, 483.01, 359/484.01, 484.02, 484.03, 484.08, 359/485.05, 487.03, 489.01, 489.06, 359/489.15, 491.01, 885, 888, 577, 580, 359/582, 585, 586, 588, 589, 590; 427/165
See application file for complete search history.

(56) References Cited

U.S. PATENT DOCUMENTS

| | | | |
|---|---|---|---|
| 7,468,148 B2 | 12/2008 | Borrelli et al. | |
| 7,510,989 B2 | 3/2009 | Borrelli et al. | |
| 7,648,656 B2* | 1/2010 | Borrelli | C03B 23/047 359/484.01 |
| 7,666,527 B2 | 2/2010 | Okami et al. | 428/701 |
| 7,683,450 B2 | 3/2010 | Hart et al. | |
| 8,067,102 B2 | 11/2011 | Okami et al. | 428/701 |
| 8,709,582 B2 | 4/2014 | Zheng et al. | 428/216 |
| 2003/0049446 A1* | 3/2003 | Schissel | C03C 25/106 428/375 |
| 2006/0110587 A1* | 5/2006 | Okami | G02B 5/205 428/216 |
| 2008/0226887 A1* | 9/2008 | Chang | C03C 17/36 428/220 |
| 2009/0086317 A1* | 4/2009 | Etori | G03B 21/60 359/449 |
| 2009/0297812 A1 | 12/2009 | Cangemi et al. | |
| 2010/0313875 A1* | 12/2010 | Kennedy | F24J 2/055 359/359 |

OTHER PUBLICATIONS

Machine Translation JP2009217177.
Apr. 2, 2014 International Search Report issued in counterpart application No. PCT/US2013/070486.

* cited by examiner

MONOLITHIC, LINEAR GLASS POLARIZER AND ATTENUATOR

PRIORITY

This application claims the benefit of priority under 35 U.S.C. §119 of U.S. Provisional Application Ser. No. 61/728,482 filed on Nov. 20, 2012 in the name of inventors Rachid Gafsi and Jue Wang, the content of which is relied upon and incorporated herein by reference in its entirety.

FIELD

The disclosure is directed to an integrated monolithic linear polarizer and attenuator that is made by integrating two different optical elements, a polarizer and attenuation filter, into a single element that is both polarizing and attenuating. The element is operative in near infrared (NIR) at wavelengths in the range of 1275 nm to 1635 nm.

BACKGROUND

Telecommunications equipment uses both attenuators and optical isolators. The attenuators can be used either temporarily to test power levels by adding a calibrated amount of signal loss or they can be installed permanently to properly match transmitter and receiver power levels. Fiber-optic telecommunication systems need a certain amount of optical power to work properly, but too much power can cause problems. There are cases where power may need to be restricted, for example, when couplers do not distribute signals evenly or to protect sensitive instruments. Attenuators discard surplus optical power and they can reduce signal levels in communication systems to those that the receivers can handle best. This makes it possible for all terminals in a network to use the same transmitters and receivers, even though light traveling between them suffers different losses. Adding attenuators also makes it possible to use the same terminal equipment in all parts of a local network. The terminal next to the distribution node might receive a signal 20 dB higher than one on the opposite corner of the building, but an attenuator can balance the power levels. The most common and least costly attenuators are filters that block a fixed portion of the in-coming light. These attenuators are installed in communication systems to balance power levels, and normally these attenuators will not need to be changed again.

Optical isolators are used to prevent back-reflections and other noise from reaching sensitive optical components in telecommunications systems. They act as one-way paths through which the telecommunication's frequency light passes. Optical isolators consist of, in sequence, a first or input polarizer, typically one with a vertical polarization axis to enhance the contrast ratio and clean the vertically polarized incoming light, a Faraday rotator for receiving the vertically polarized light and rotating it by 45°, and a second or output polarizer whose polarization axis is at 45° to the polarization axis of the first polarizer. The 45° rotated light from the Faraday rotator completely passes through the second polarizer to a receiver with virtually no losses, for example, an optical fiber or an analyzer. If any light is reflected backwards by receiver, the second polarizer will polarizer the back-reflected light by 45° and Faraday rotator will rotate the light from the second polarizer by an additional 45°. The back-reflected light emerging from the rotator has become horizontally polarized and will be blocked by the first polarizer that permits the passage of only vertically polarized light. Thus, any reflected light that travels in the direction opposite that of the incoming light will be extinguished. Optical isolators are important components in high-performance systems because of the way they can block noise traveling in the wrong direction through the fiber.

At the present time there is no single, integrated element, that can accomplish both these tasks; that is, act as an optical attenuator and as an optical isolator. The present disclosure provides such an element and a device that uses the element.

SUMMARY

The disclosure is directed to an element that is capable of acting as both an optical polarizer and an optical attenuator, thus integrating both functions into a single element. The element comprises a monolithic or one piece glass polarizer (herein also call the "substrate"), a multilayer "light attenuation or light attenuating" coating LA that has been optimized for use at selected wavelengths and attenuations deposited on at least one polarizer facial surface, and a multilayer anti-reflective, AR, coating on top of the LA coating, resulting in the sequence "substrate/LA/AR". The LA coating is designed to reduce or remove excess energy in an optical system by decreasing the transmission levels of the incident light energy. The AR coating reduce surface reflection losses, improves contrast and boosts transmission through the optical surface. The combination of LA and AR coatings on the surface of a polarizing optical substrate results in an integrated optical polarizer/attenuator that also prevents backscatter of light in optical transmission systems.

While in one embodiment the LA and AR coating are deposited on one surface of the polarizer, in another embodiment the LA and AR coatings are deposited on both polarizer surfaces. In a further embodiment the element comprises a glass polarizer having a $SiO_2$ coating deposited on at least one polarizer surface, an LA coating that has been optimized for use at selected wavelengths and attenuations deposited on top of the $SiO_2$ coating, and an anti-reflective (AR) coating on the surface of the LA coating, resulting in the overall sequence of substrate/$SiO_2$/LA/AR. In an additional embodiment the LA and AR coatings are applied to one surface of the polarizer and an AR coating only is applied to the second The anti-reflective, AR, coating is a multilayer coating comprising alternating layers of a high refractive index material, H', having a refractive index greater than 1.7 and a layer of a low refractive index material, L', having a refractive index of less than or equal to 1.7. In a further embodiment, a sealing or capping layer of $SiO_2$ can be placed on top of the last deposited layer of the anti-reflective coating when the last deposited layer of the anti-reflective coating is not $SiO_2$. The light attenuating coating LA is a multilayer coating consisting of a plurality of layers HL of selected attenuating materials, where H is a high refractive index material and L is a low refractive index material. In the Examples given herein the multilayer LA coating comprises ITO (indium tin oxide), Si and $Cr_2O_3$, the ITO layer being the first layer deposited on the polarizing glass substrate, or on a $SiO_2$ layer deposited on the polarizing glass substrate prior to the deposition of the ITO layer. The attenuation of the element can be set to any desired attenuation level by changing the thickness and/or number of attenuating material layers. Further, the order in which the attenuation layers are deposited can be changed from HL as exemplified herein, to LH In an aspect the disclosure is also directed to an optical isolator/attenuator device for use at telecommunications frequencies, the optical isolator/attenuator comprising a Faraday rotator having a first end and a second end, and a polarizing element at each of said ends, at least one of said polarizing elements being a monolithic polarizing/attenuating element. In an embodiment both of the optical isolator/attenuator device polarizing elements are a monolithic polarizing/attenuating element.

In one embodiment the polarizer/attenuator of the disclosure, and an optical isolator using such polarizer/attenuator element is operative in the wavelength range of 1275 nm to 1635 nm. In another embodiment the polarizer/attenuator of the disclosure, and an optical isolator using such polarizer/attenuation is operative in the wavelength range of 600 nm to 1100 nm. In a further embodiment the polarizer/attenuator of the disclosure, and an optical isolator using such polarizer/attenuation is operative in the wavelength range of 1700 nm to 2000 nm. In an additional embodiment the polarizer/attenuator of the disclosure, and an optical isolator using such polarizer/attenuation is operative in the wavelength range of 2000 nm to 2300 nm.

DETAILED DESCRIPTION

In the following detailed description, numerous specific details may be set forth in order to provide a thorough understanding of embodiments of the invention. However, it will be clear to one skilled in the art when embodiments of the invention may be practiced without some or all of these specific details. In other instances, well-known features or processes may not be described in detail so as not to unnecessarily obscure the invention. In addition, like or identical reference numerals may be used to identify common or similar elements.

Herein the terms "substrate", "polarizing substrate" and "Polarcor sub" are used to define any glass or glass element that is of itself an optical polarizer. Such glass polarizers are commercially available from a number of sources. Herein commercially available Polarcor® optical polarizers (Corning Incorporated, Corning, N.Y.) are used as exemplary substrates to make the integrated polarizing and attenuating optical elements of this disclosure. Also herein, with reference to the coating(s) applied to the monolithic linear glass polarizer, the coatings and individual layers of a multilayer coating are adherent to the polarizer glass, a previously applied coating, or a previously applied layer of a multilayer coating without the use of any adhesive material or interlayer material between the polarizer and a coating, or the layers of a coating, or adjacent coatings. An adhesive material is typically a liquid or a semi-liquid that bonds items together and require curing (hardening) by either evaporating a solvent or by chemical reactions that occur between two or more constituents of the adhesive—glues and epoxy resins being examples. Interlayer materials are typically polymeric materials that can hold or bond together two different items without curing—double stick tape being an example. Further, herein the term "metal oxide" means an oxide consisting of one metal and oxygen, for example $Cr_2O_3$, $Al_2O_3$, $GeO_2$, et cetera, and mixed-metal oxide mean an oxide consisting of at least two metals and oxygen, for example, indium-tin-oxide and $SrTiO_3$.

The device of the present disclosure is directed to an element that has integrated polarizing and attenuating functions, and can be used to make an integrated optical isolator/attenuator when combined with a Faraday rotator. Optical isolators utilize optical polarizers in combination with a Faraday rotator to reduce or eliminate back-reflectance in telecommunications systems. Optical polarizers of the type used herein are classified as monolithic and absorptive type glass polarizers which are optimized for telecommunication related wavelengths. Optical polarizers are well described in the art; for example, U.S. Pat. Nos. 7,648,656, 7,510,989 and 7,461,488 describe making optical polarizers containing various metals. Metals that can be used in the preparation of optical polarizers include silver, copper and copper/cadmium, and additionally metals such as platinum, palladium, palladium, gold, and other metals. For example, Japanese Patent Application Publications 2009-217176A and 2009-217177A describe making polarizers and making optical isolators, for example pig-tail type isolators for optical communications, the isolators comprising a Faraday rotator and a polarizing element on either end of the Faraday rotator.

At the present time, in order to attenuate the optical signal emitted by telecommunications transmission laser diodes, VOAs (variable optical attenuators) or other optical components are used. The present disclosure describes an element that can act to both polarize light and attenuate light, a method of making the element, and a device that enables achieving a desired and fixed attenuation while also acting as an optical isolator. In a polarization dependent isolator ("PDI"), optical polarizer elements are used as the input and the output polarizer of the isolator. In accordance with the present disclosure, the desired attenuation is achieved by placing an inorganic light attenuating, LA, coating on top of at least one polarizer surface and an anti-reflective, AR, coating on top of the inorganic LA coating. In the polarizing/attenuating devices described herein the polarizers can be used as the input (0 degree polarization or vertical axis) element or as the output (45 degree polarization) element of the optical isolator. In an embodiment the amount of attenuation is in the range of greater than 0 dB to 3 dB over the wavelength range of 1275-1635 nm. In another embodiment the amount of attenuation can be in the range of 0.5 dB to 3 dB over the wavelength range of 1275-1635 nm. The design concept of attenuation and antireflection described herein can also be applied to other wavelength ranges by changing LA coating and AR coating accordingly using the teachings disclosed herein. For example, the design can be use at wavelength in the range of 600-1100 nm, 1700-2000 nm and 2000-2300 nm. The polarizer/attenuator elements in these ranges can also be used in optical isolators.

Figure 1:
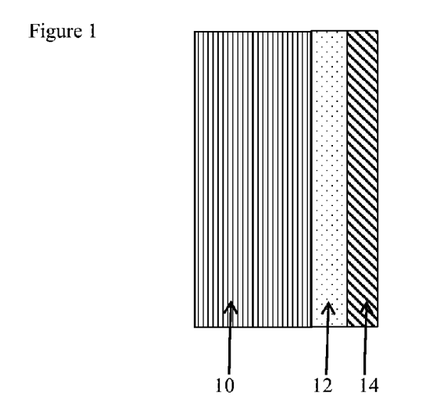
FIG. 1 is a schematic drawing of an element that is a monolithic glass polarizer with an integrated attenuating functionality, the element comprising a glass polarizer 10, an inorganic light attenuating coating, or LA coating, 12, also called herein an attenuation coating or film 12, that is optimized for the desired degree (percentage) attenuation and wavelengths of the incoming light, and an anti-reflective coating or film 14.

FIG. 1 illustrates the structure of the optical element having an integrated functionality to polarize/analyze incident polarized light and attenuate it with a desired attenuation. The inorganic film can be deposited on the polarizer by any of the conventional deposition methods. The article in FIG. 1 comprises a polarizer 10, an AR coating 14, and an LA film 12 that is in between the polarizer 10 and AR coating 14. The LA coating film 12 is optimized for the desired degree of attenuation and wavelengths.

Figure 2:
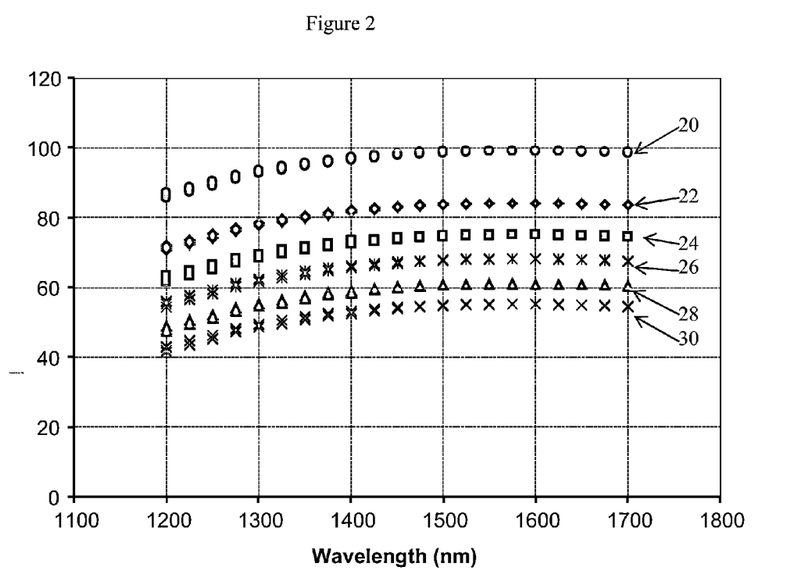
FIG. 2 is graph illustrating of percentage transmission versus wavelength of the integrated linear polarizer and attenuator at attenuations of 0, 1, 1.5, 2.0, 2.5.and 3.0 dB that are represented by the curves, 20, 22, 24, 26, 28 and 30, respectively.

In order to achieve the desired attenuation for the operating wavelength range of the laser diode, the LA coating can be designed and optimized for either deposition on one side of the polarizer, or designed and optimized for deposition on both sides. With the use of such element, a polarization dependent isolator can have an integrated functionally, that is, be an "isolator plus attenuator." FIG. 2, shows typical and simulated percent transmission versus wavelength spectra for integrated linear polarizers with attenuation of 0, 1, 1.5, 2, 2.5 and 3.0 dB, respectively. which are individually represented by numerals 20, 22, 24, 26, 28, and 30, respectively, located on the right. The different attenuations are dependent on the thickness of the attenuating coating that is applied on the polarizer and the composition of the attenuating coating.

Figure 3:
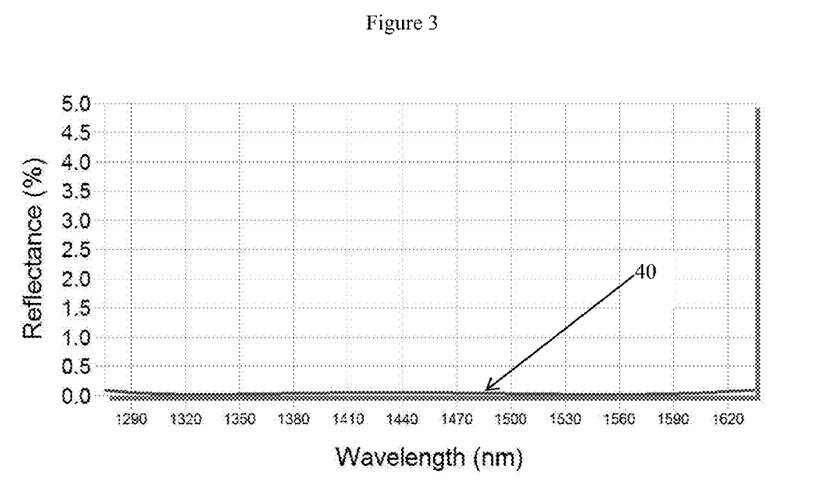
FIG. 3 illustrates the spectral reflectance of a polarizer having a non-attenuating, 4-layer AR coating.

FIG. 3 illustrates the spectral reflectance of a polarizer having only a non-attenuating, 4-layer AR coating on a Polarcor® substrate and no attenuation coating. This AR-coated polarizer serves as the baseline example for a polarizer with an AR coating, but no attenuating coating. The designed AR coating, beginning with the substrate and ending with air, is: (1) substrate, and (2) AR coating: 51 nm $Nb_2O_3$, 56 nm $SiO_2$, 248 nm $Nb_2O_5$, 236 nm $SiO_2$, air. Polarizers with an LA/AR attenuation/anti-ref;ection will be compared to this example. No capping layer is applied because the last layer of the AR coating is $SiO_2$.

Figure 4:
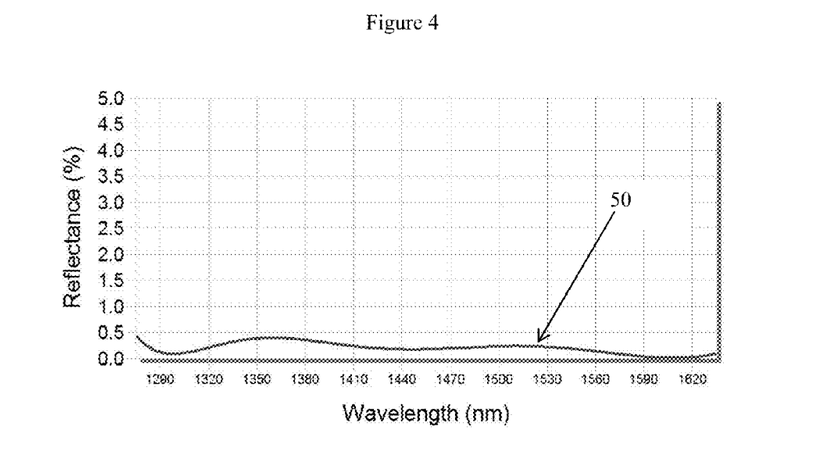
FIG. 4 illustrates the spectral reflectance of polarizer having a 4-layer, 15% attenuating LA coating and a 4-layer AR coating on top of the LA coating.

FIG. 4 illustrates the spectral reflectance of a polarizer/attenuator element having an 8-layer 15% attenuating coating comprising a 4-layer LA coating and a 4-layer (AR coating on top of the LA coating. The overall coating design of the 15% absorbing polarizer/attenuator element, beginning with the substrate, is: (1) substrate, (2) multilayer LA coating: 317 nm ITO, 22 nm Si, 67 nm $Cr_2O_3$, 177 nm Si, and (3) multilayer AR coating: 545 nm $Nb_2O_5$, 100 nm $SiO_2$, 111 nm $Nb_2O_5$, 310 nm $SiO_2$, air; where ITO is indium-tin-oxide. No capping layer is applied because the last layer of the AR coating is $SiO_2$.

Figure 5:
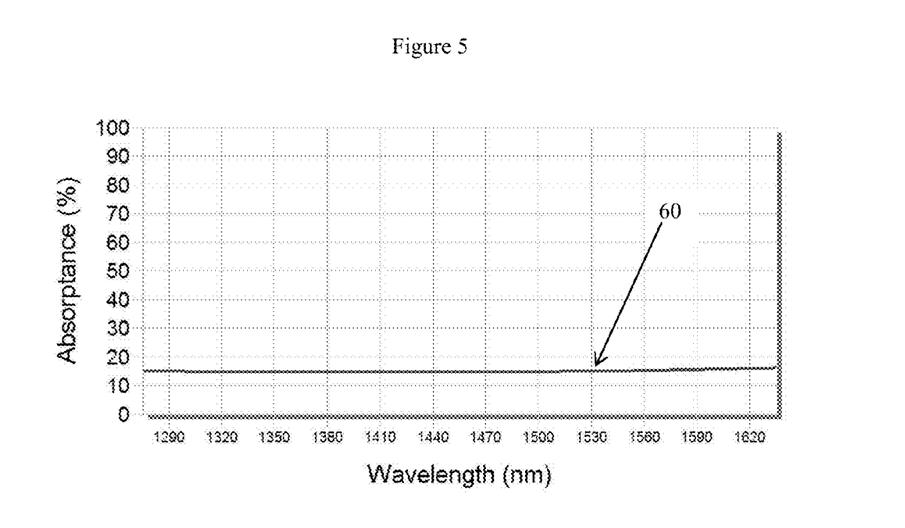
FIG. 5 illustrates the absorbance of a polarizer having a 4-layer, 15% attenuating LA coating and a 4-layer AR coating on top of the LA coating.

FIG. 5 illustrates the spectral absorbance of a polarizer/attenuator element having an 8-layer 15% attenuating coating comprising a 4-layer LA coating and a 4-layer AR coating on top of the LA coating. The overall coating design of the 15% polarizer/attenuator element is the same as that of FIG. 4, and beginning with the substrate, it is: (1) substrate, (2) multilayer LA coating: 317 nm ITO, 22 nm Si, 67 nm $Cr_2O_3$, 177 nm Si, and (3) multilayer AR coating: 545 nm $Nb_2O_5$, 100 nm $SiO_2$, 111 nm $Nb_2O_5$, 310 nm SiO, air; where ITO is indium-tin-oxide. No capping layer is applied because the last layer of the AR coating is $SiO_2$.

Figure 6:
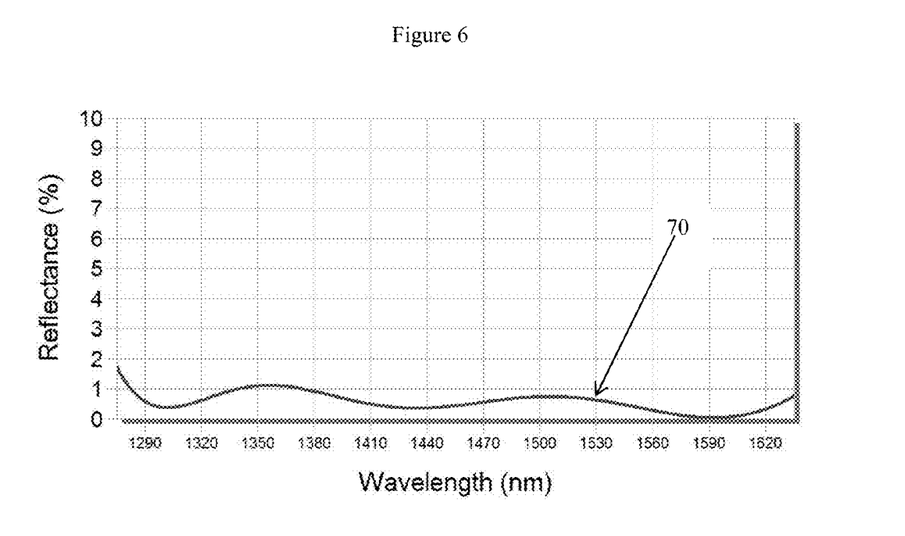
FIG. 6 illustrates the spectral reflectance of a polarizer having a 4-layer LA, 24% attenuating coating and a 4-layer AR coating on top of the LA coating.

FIG. 6 is illustrates the spectral reflectance of a polarizer/attenuator element having an 8-layer 24% attenuating coating comprising a 4-layer LA coating and a 4-layer AR coating. The overall coating design of the 24% polarizer/attenuator element, beginning with the substrate, is: (1) substrate, (2) multilayer LA coating: 535 nm ITO, 21 nm Si, 120 nm $Cr_2O_3$, 244 nm Si, and (3) AR coating: 539 nm $Nb_2O_5$, 188 nm $SiO_2$, 62 nm $Nb_2O_5$, 369 nm $SiO_2$, air; where ITO is indium-tin-oxide. No capping layer is applied because the last layer of the AR coating is $SiO_2$.

Figure 7:
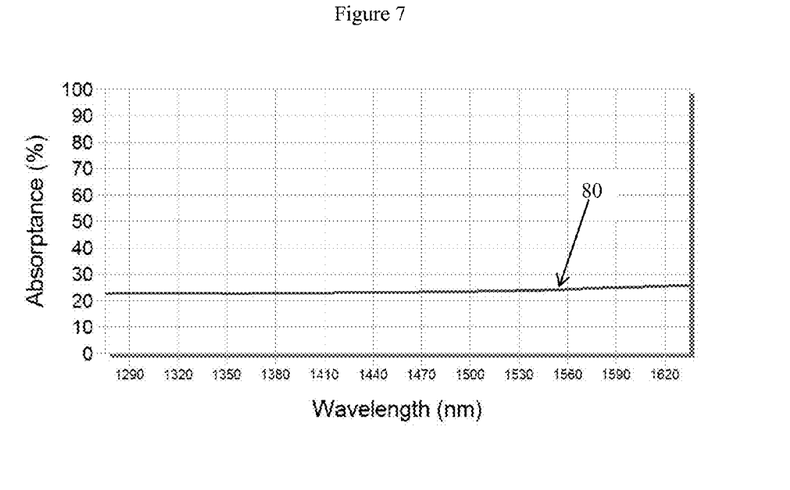
FIG. 7 is illustrates the absorbance of a polarizer having a 4-layer, 15% attenuating LA coating and a 4-layer AR coating on top of the LA coating.

FIG. 7 is illustrates the spectral absorbance of a polarizer/attenuator element having an 8-layer, 24% absorbing coating comprising a 4-layer LA coating and a 4-layer AR coating on top of the LA coating. The overall coating design of the 24% absorbing coating is the same as that of FIG. 6, and beginning with the substrate it is: (1) substrate, (2) multi-layer LA coating: 535 nm ITO, 21 nm Si, 120 nm $Cr_2O_3$, 244 nm Si, and (3) multilayer AR coating 539 nm $Nb_2O_5$, 188 nm $SiO_2$, 62 nm $Nb_2O_5$, 369 nm $SiO_2$, air; where ITO is indium-tin-oxide. No capping layer is applied because the last layer of the AR coating is $SiO_2$.

FIGS. 8-13 illustrate the spectral reflectance and the transmittance of additional polarizer/attenuator elements with the backside effect ignored. The "backside effect" refers to reflectance that occurs at the surface furthest from where the light first enters the polarizer/attenuator element. The reason for excluding the backside effect from FIGS. 8-13 is to determine and show the real effect of the enginnered absorbing LA/AR coating applied to the frontside surface where the light enters polarizer/attenuator element. The backside reflection can be eliminated by applying an AR coating on the backside of the polarizer or by application of the absorbing LA/AR coating described earlier herein. The element in FIG. 14 illustrates a polarizer/attenuator element comprising a polarizer 80 having an absorbing LA/AR coating 82 as disclosed herein applied to frontside surface F of polarizer substrate 80 and an AR (only) coating 84 applied to the backside surface B of polarizer 80. Light hv impinges on the frontside surface of absorbing LA/AR coating 82 where it is attenuated by coating 82. The light then passes through the polarizer 80 where it is polarized, and the polarized light then passes through the backside surface B of polarizer 80 which can have an AR coating 84 coating applied In FIG. 14 numeral 86 represents any light that may be reflected from the frontside surface F and numeral 88 indicates any light that is reflected from the backside surface B. Thus, using the teachings of this disclosure, one can prepare a polarizer/attenuator having a LA/AR coating on one or both of the polarizer substrate 80's surfaces, or an LA/AR coating on polarizer 80's frontside surface and an Ar coating only on the polarizer 80's backside surface.

Figure 8:
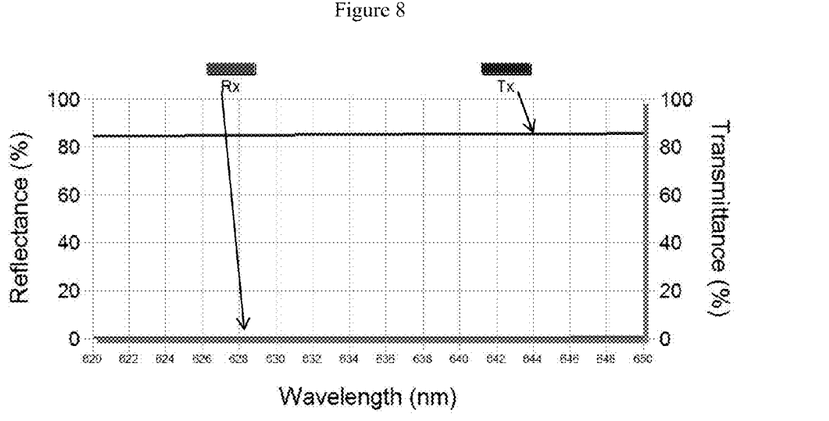
FIG. 8 illustrates the spectral reflectance (Rx) and the transmittance (Tx) of a 5-layer 15% absorbing AR coating on a Polarcor® substrate, also called "Polarcor® sub", with backside effect ignored and wavelengths ranging from 620 nm to 650 nm. The 15%-absorbing LA/AR coating design is Polarcor® $sub_{13}$ 225 nm $ITO_{13}$ 135 nm $Cr_2O_3$ 232 nm $SiO_2$ 93 nm $Nb_2O_5$ 333 nm $SiO_2$ air.

FIG. 8 illustrates the spectral reflectance and transmittance of 5-layer 15% absorbing AR coating on a Polarcor® substrate, also called "Polarcor® sub", with backside effect ignored and wavelengths ranging from 620 nm to 650 nm. The 15%-absorbing LA/AR coating design is Polarcor® $sub_{13}$ 225 nm $ITO_{13}$ 135 nm $Cr_2O_3$_232 nm $SiO_2$_93 nm $Nb_2O_5$_333 nm $SiO_2$_air.

Figure 9:
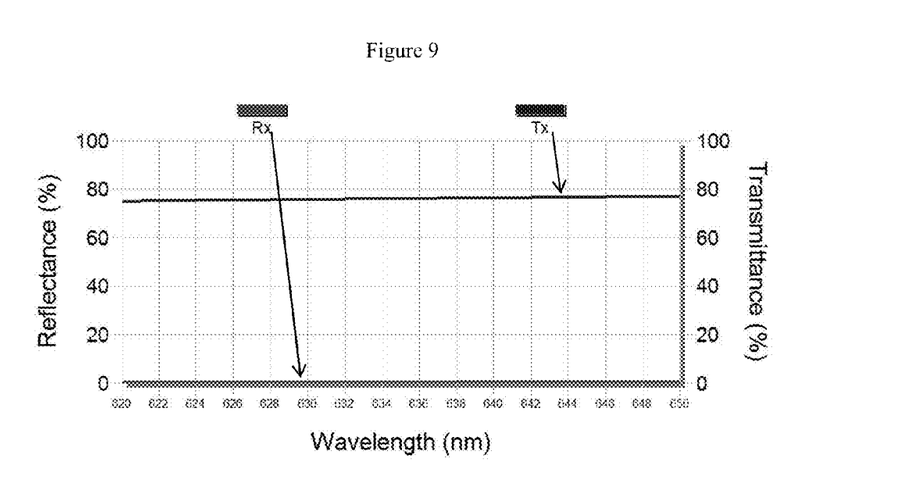
FIG. 9 illustrates the reflectance (Rx) and the transmittance (Tx) of a 5-layer 24% absorbing AR coating on a Polarcor® substrate with backside effect ignored and wavelengths ranging from 620 nm to 650 nm. The 24%-absorbing LA/AR coating design is Polarcor® sub_229 nm ITO_79 nm $Cr_2O_3$ 213 nm $SiO_2$ 101 nm $Nb_2O_5$ 326 nm $SiO_2$ air.

FIG. 9 illustrates the spectral reflectance and transmittance of 5-layer 24% absorbing AR coating on a Polarcor® substrate with backside effect ignored and wavelengths ranging from 620 nm to 650 nm. The 24%-absorbing LA/AR coating design is Polarcor® sub_229 nm ITO_79 nm $Cr_2O_3$_213 nm $SiO_2$_101 nm $Nb_2O_5$_326 nm $SiO_2$_air.

Figure 10:
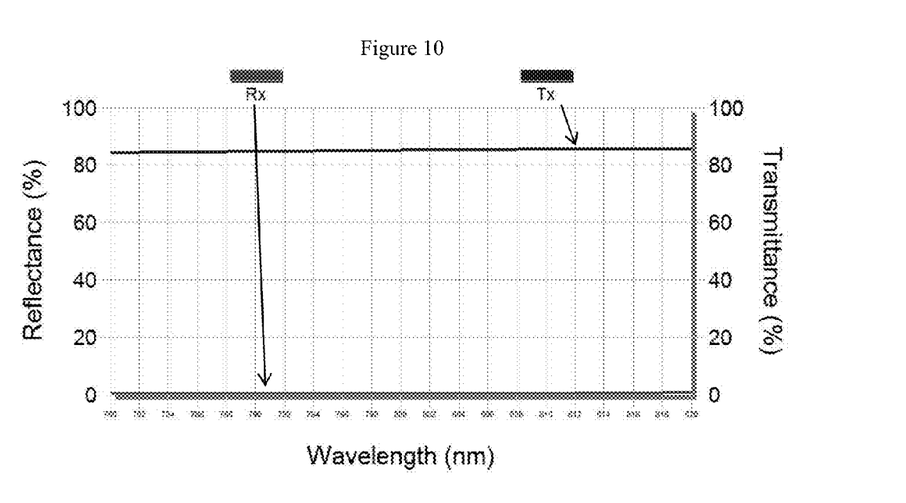
FIG. 10 illustrates the spectral reflectance (Rx) and the transmittance (Tx) of a 5-layer 15% absorbing AR coating on a Polarcor® substrate with backside effect ignored and wavelengths ranging from 780 nm to 820 nm. The 15%-absorbing LA/AR coating design is Polarcor® sub_309 nm ITO_280 nm $Cr_2O_3$ 287 nm $SiO_2$ 167 nm $Nb_2O_5$ 390 nm $SiO_2$ air.

FIG. 10 illustrates the spectral reflectance and transmittance of 5-layer 15% absorbing AR coating on a Polarlor substrate with backside effect ignored and wavelengths ranging from 780 nm to 820 nm. The 15%-absorbing LA/AR coating design is Polarcor® sub_309 nm ITO_280 nm $Cr_2O_3$_287 nm $SiO_2$_167 nm $Nb_2O_5$_390 nm $SiO_2$_air.

Figure 11:
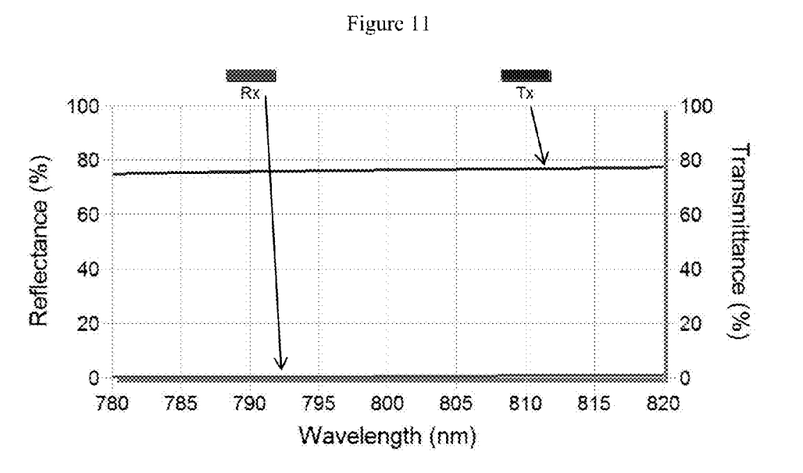
FIG. 11 illustrates the spectral reflectance (Rx) and the transmittance (Tx) of a 5-layer 24% absorbing AR coating on a Polarcor® substrate with backside effect ignored and wavelengths ranging from 780 nm to 820 nm. The 24%-absorbing LA/AR coating design is Polarcor® sub_347 nm ITO_551 nm $Cr_2O_3$ 239 nm $SiO_2$ 129 nm $Nb_2O_5$ 392 nm $SiO_2$ air.

FIG. 11 illustrates the spectral reflectance and transmittance of 5-layer 24% absorbing AR coating on a Polarcor® substrate with backside effect ignored and wavelengths ranging from 780 nm to 820 nm. The 24%-absorbing LA/AR coating design is Polarcor® sub_347 nm ITO_551 nm $Cr_2O_3$_239 nm $SiO_2$_129 nm $Nb_2O_5$_392 nm $SiO_2$_air.

Figure 12:
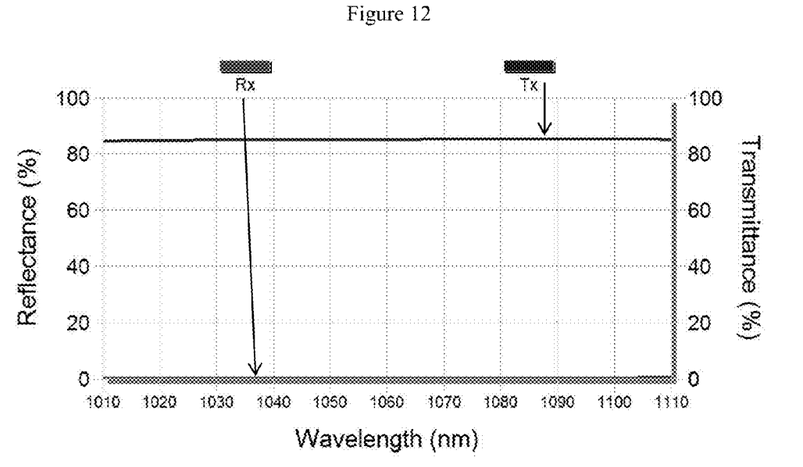
FIG. 12 illustrates the spectral reflectance (Rx) and the transmittance (Tx) of a 5-layer 15% absorbing AR coating on a Polarcor® substrate with backside effect ignored and wavelengths ranging from 1010 nm to 1110 nm. The 15%-absorbing LA/AR coating design is Polarcor® sub_455 nm $ITO_{13}$ 477 nm $Cr_2O_3$ 319 nm $SiO_2$ 162 nm $Nb_2O_5$ 526 nm $SiO_2$ air.

FIG. 12 illustrates the spectral reflectance and transmittance of 5-layer 15% absorbing AR coating on a Polarcor® substrate with backside effect ignored and wavelengths ranging from 1010 nm to 1110 nm. The 15%-absorbing LA/AR coating design is Polarcor® sub_455 nm ITO_477 nm $Cr_2O_3$_319 nm $SiO_2$_162 nm $Nb_2O_5$_526 nm $SiO_2$_air.

Figure 13:
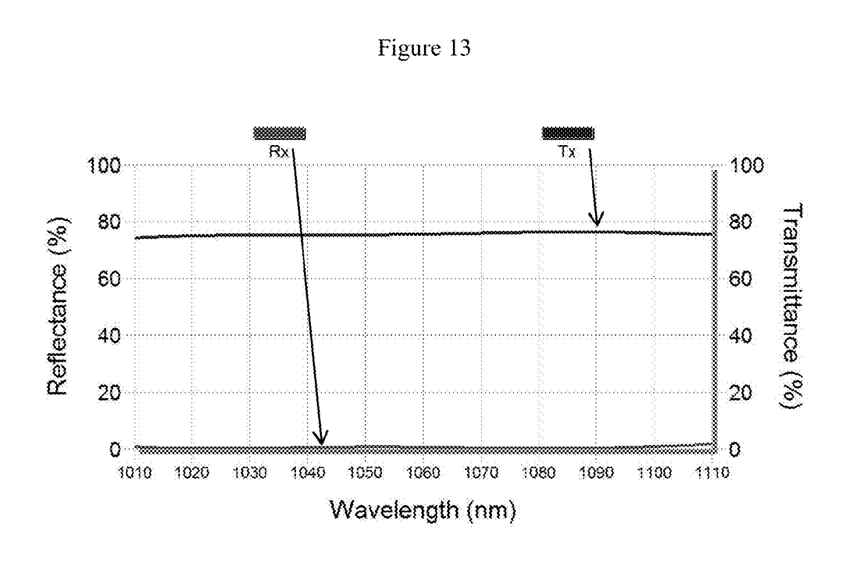
FIG. 13 illustrates the reflectance (Rx) and the transmittance (Tx) of a 5-layer 24% absorbing AR coating on a Polarcor® substrate with backside effect ignored and wavelengths ranging from 1010 nm to 1110 nm. The 24%-absorbing LA/AR coating design is Polarcor® sub_666 nm ITO_1010 nm $Cr_2O_3$ 36 nm $SiO_2$ 546 nm $Nb_2O_5$ 574 nm $SiO_2$ air.
Figure 14:
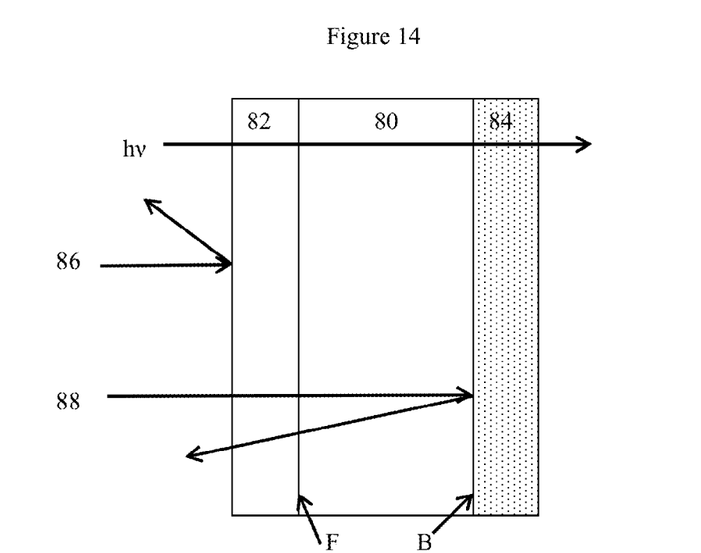
FIG. 14 illustrates a polarizer/attenuator element comprising a polarizer 80 having an absorbing LA/AR coating 82 as disclosed herein applied to frontside surface F of polarizer substrate 80 and an AR (only) coating 84 applied to the backside surface B of polarizer 80.

FIG. 13 illustrates the spectral reflectance and transmittance of 5-layer 24% absorbing AR coating on a Polarcor® substrate with backside effect ignored and wavelengths ranging from 1010 nm to 1110 nm. The 24%-absorbing LA/AR coating design is Polarcor® sub_666 nm ITO_1010 nm $Cr_2O_3$_36 nm $SiO_2$_546 nm $Nb_2O_5$_574 nm $SiO_2$_air.

While there are different methods that can be used to prepare the integrated isolator/attenuator of this disclosure, one requirement that must be fulfilled is that during the deposition of the attenuating coating and the anti-reflection coating is that the temperature of the substrate must be kept below the temperature at which the metallic particles in the polarizing glass substrate will respheroidize. The metallic particles in the polarizer are elongated and if they are heated to too high a temperature the particles can contract and/or become spherical particles (respheroidize) instead of remaining as elongated particles. If this occurs the polarizing properties of the glass will decrease, or they can be completely lost. The temperature at which this occurs will differ depending on what specific metallic particles, or mixture of metallic particles are present in the glass and are imparting the polarization properties to the glass. For example, if the polarizing metal is silver, copper or copper/cadmium the substrate temperature during the deposition of the coating material(s) is less than 400° C. In another embodiment the coating deposition temperature is less than 350° C. In a further embodiment the coating deposition temperature is less than 300° C. The polarizing metal is selected from the group consisting of silver, copper or copper/cadmium. In an embodiment the polarizer, in addition to containing a polarizing metal selected from the silver, copper or copper/cadmium further contains a noble metal selected from the group consisting of platinum, palladium, osmium, iridium, rhodium or ruthenium as is mentioned in U.S. Pat. Nos. 7,468,148 and 7,5110,989, the noble metal being present in an amount in the range of 0.0001 wt. % to 0.5 wt. % measured as zero valent metal. The temperature at which the polarizing metal particles in the glass will contract or respheroidize can be experimentally determined before the coating process by heating the glass polarizer and observing the temperature at which contraction and/or respheroidization occurs. This process is to an extent dependent on both time and temperature. For example, contraction/respheroidization can occur in minutes when the polarizer is heated to 500° C. At a temperature of 400° C. the time is approximately one hour, or more.

The attenuation and anti-reflection coatings can both be applied by physical and chemical vapor deposition methods known in the art. A single method can be used to apply both coatings or a different method can be used for different coatings if this is necessary. The deposition of the attenuating LA coating and AR coating can be done with or without the use of a mask. If a mask is used it can be a regular mask, a reverse mask or a partial mask which have been described in in U.S. Pat. No. 7,465,681 and Patent Application No. 2009/0297812, which also describes the use of a reverse mask and a partial mask, respectively. Some exemplary deposition methods have been described in U.S. Pat. No. 7,465,681 and Patent Application No. 2009/0297812, which also describes the use of a reverse mask and a partial mask, respectively. The methods include:

(1) Conventional deposition (CD) in which the material(s) that is/are to be deposited are heated, in vacuum, in the presence of a substrate upon which a coating is to be deposited, to the molten state by either resistance heating or electron bombardment. When molten, evaporation of the material(s) occurs and a coating is deposited on the substrate. In this method the substrate is generally heated. However, overall, this method is generally not well suited to making telecommunications devices.

(2) Ion-Assisted Deposition (IAD) is similar to the CD method, but it has the added feature that the coating being deposited is bombarded with energetic ions of an inert gas, for example argon ions, during the deposition process, plus some ionized oxygen, which in the case of oxide coatings is generally necessary to improve the coating stoichiometry. The bombardment serves to transfer sufficient momentum to the coating being deposited to overcome surface energies, provide surface mobility and produce dense, smooth coatings. An advantage of this method is that little or no substrate heating is required.

(3) Ion Beam Sputtering (IBS) in which an energetic ion beam (for example, argon ions in the range of 500 eV to 1000 ev) are directed to a target material, typically an oxide material. The momentum transferred upon impact is sufficient to sputter-off the target material to a substrate where it is deposited as a smooth, dense coating. However, this method also has drawbacks which limit its utility; for example, (a) deposition uniformity over the surface of the substrate can become a problem that limits product quality; (b) as the target becomes eroded the uniformity of the deposited coating changes; and (c) the bombardment energy is quite high, leading to dissociation of the deposited firm.

4) Plasma Ion Assisted Deposition (PIAD) which is similar to IAD except that the momentum is transferred to the depositing coating via a low voltage, but high current density plasma. Typical bias voltages are in the range of 90-160 V and current densities are in the range of $mA/cm^2$.

The deposition of the attenuating LA coating and AR coating can be done with or without the use of a mask. In addition, the deposition of the coating layers can be done with or without plasma ion-assistance, during or after the deposition of the individual layers. In addition, when oxide coatings are formed an oxygen-containing plasma can be used during the deposition process to insure that the deposited oxide material is not depleted of oxygen. However, when Si(0), or simply Si, is one of the materials used in the multilayer attenuation coating, no oxygen should be present in any plasma that is used during the deposition of the Si layer. When a metal oxide is deposited on top of the Si layer oxygen can be bled into the system during the metal oxide deposition as is explained below in more detail.

The attenuation coating of the disclosure is a multilayer coating, the coating materials being selected from the group consisting of metal and mixed-metal oxide materials having a refractive index "n" of greater than 1.7, the L layer, and silicon, Si or Si(0), with all of said metal oxides and silicon having a non-zero extinction coefficient. In an embodiment at least one layer of the metal or mixed-metal oxide material in the attenuation coating has a refractive index greater than 2.0. In another embodiment the at least one layer of the metal or mixed-metal oxide material in the attenuation coating has a refractive index greater than 2.1. Silicon, n greater than approximately 3.4, is used in the formation of the attenuation coating. When Si is used as an attenuation coating material it is deposited without the use of any oxygen or any oxygen-containing plasma being used during the Si deposition step, the plasma being used to smooth and densify the film being deposited as indicated in U.S. Pat. No. 7,465,681 and Patent Application No. 2009/0297812 cited above. The Si is deposited on top of an oxygen containing material, for example, ITO as in the Examples herein. During Si deposition only argon or other inert gas plasma should be used. As the Si is laid down on top of an oxide material, the first few atomic layers of deposited Si form a Si—O bond with oxygen atoms present at the surface of the oxide material upon which it is being deposited, for example, the glass polarizer substrate, a $SiO_2$ film deposited on the polarizer's surface or a metal or mixed-metal oxide. Once the deposition surface is covered with Si no further Si—O bonds can form and the Si layer is built up until it reaches the design specification. After the Si layer has been deposited an oxide material, MO, can be deposited on top of the Si layer. As this oxide material is deposited it reacts with Si atoms at the surface of the Si layer to form Si—O-M bonds at the surface, M being the metal in the oxide being deposited. Once a few atomic layers of the oxide material has been deposited on top of the Si layer no further Si—O-M bonds are formed.

The attenuating coating is a multilayer coating formed using at least two different materials having different refractive indices and extinction coefficients, one material being a high refractive index material H and the other being a low refractive index material L. The H material is Si and the L material is a metal or mixed metal oxide that has a refractive index n greater than 1.7 and an extinction coefficient than 0.001. In an further embodiment at least one of the L materials in the multilayer attenuation coating has a refractive index greater than 2.1 and an extinction coefficient greater than 0.001. The H material in the multilayer attenuation coating is Si, refractive index greater than 3.4 and an extinction greater than 0.001. Exemplary L materials that can be used in forming the attenuation coating include indium-tin-oxide (ITO), $Cr_2O_3$, ZnO, $Nb_2O_5$ and $GeO_2$. The thickness of the ITO layer is in the range of 250 nm to 600 nm. The thickness of the Si(0) layer(s) is in the range of 20 nm to 700 nm, and the thickness of the $Cr_2O_3$, ZnO, $Nb_2O_5$ and $GeO_2$ layer(s) is in the range of 20 nm to 200 nm. The overall thickness of the attenuation coating is in the range of 300 nm to 1500 nm.

The anti-reflection coating is a multilayer oxide coating comprising alternating layers of a high refractive index ("n") material H' having n greater than 1.7 and a low refractive index material L' having n less than or equal to 1.7. The high index AR coating material are selected from the group consisting of $ZrO_2$, $HfO_2$, $Ta_2O_5$, $Nb_2O_5$, $TiO_2$, $Y_2O_3$, $Sc_2O_3$, $Si_3N_4$, $SrTiO_3$ and $WO_3$. The low index AR coating material is selected from the group consisting of $SiO_2$, fused silica, HPFS®, F-doped $SiO_2$ (F—$SiO_2$), and $Al_2O_3$, and fluorides $MgF_2$, $CaF_2$, $BaF_2$, $YbF_3$, $YF_3$. If the last deposited layer of the AR coating is not $SiO_2$, a sealing or capping layer of $SiO_2$ can be placed on top of the last deposited layer. The thickness of the high refractive index layer(s) is in the range of 50 nm to 700 nm. The thickness of the low refractive index layer(s) is in the range of 75 nm to 500 nm. The overall thickness of the AR coating is in the range of 700 nm to 1500 nm. When a $SiO_2$ capping layer is used the thickness of the capping layer is in the range of 25 nm to 150 nm. One pair of a high refractive index layer and a low refractive index layer is a coating period, and the AR coating comprises at least one period to a plurality of periods in the range of 2-20; thus the number of AR coating periods is in the range of 1-20.

Thus, in one aspect this disclosure is directed to an integrated monolithic linear polarizer/attenuator element comprising of a glass polarizer having polarizing particles therein, a multilayer attenuation coating deposited on at least one surface of the glass polarizer and a multilayer anti-reflection coating deposited on top of the attenuation coating. The polarizing particles in the glass polarizer are selected from the group consisting of silver, copper and copper/cadmium. In an embodiment the glass polarize further comprises a noble metal selected from the group consisting of platinum, palladium, osmium, iridium, rhodium or ruthenium, said noble metal being present in an amount in the range of 0.0001 wt. % to 0.5 wt. % measured as zero valent metal. The attenuation obtainable by the polarizer/attenuator element is in the range of greater than 0 dB to 3 dB over the wavelength range of 1200-1700 nm.

The multilayer anti-reflection coating comprises a plurality of periods H'L', where H' is metal oxide material having a refractive index greater than 1.7 and L' is a metal oxide material having a refractive index less than 1.7. The high refractive index material is selected from the group consisting of $ZrO_2$, $HfO_2$, $Ta_2O_5$, $Nb_2O_5$, $TiO_2$, $Y_2O_3$, $Sc_2O_3$, $Si_3N_4$, $SrTiO_3$ and $WO_3$. The low refractive index material is selected from the group consisting of $SiO_2$, F-doped $SiO_2$, and $Al_2O_3$, and fluorides $MgF_2$, $CaF_2$, $BaF_2$, $YbF_3$, $YF_3$.

In another aspect the disclosure is directed to an integrated optical isolator/attenuator comprising:

a first and a second polarizing elements and a Faraday rotator for rotating light positioned after the first polarizing element and before the second polarizing element, the integrated optical isolator/attenuator both polarizing and attenuation a light beam from a light source;

at least one of the polarizing elements is a monolithic glass polarizer/attenuator element comprising a glass polarizer having a multilayer attenuation coating deposited on the glass polarizer and a multilayer anti-reflection coating deposited on top of the attenuation coating;

the polarization axis of the of the second polarizing element is offset from the polarization axis of the first polarizing axis element the number of degrees the light is rotated by the Faraday rotator; and the optical isolator/attenuates the incoming light by an amount in the range of greater than 0 dB to 3 dB.

The integrated optical isolator/attenuator has an attenuation in the range of 0.5 dB to 3 dB and is operative in the wavelength range of 1275-1635 nm. The same design concept can applied to other interested wavelength ranges by changing LA coating and AR coating accordingly. The multilayer attenuation coating materials are at least two materials selected from the group consisting of metal oxides and mixed-metal oxides having an index of refraction greater than 2 and silicon, and the total thickness of the attenuation coating is in the range of 300 nm to 1500 nm. The multilayer anti-reflection coating comprises a plurality of periods H'L', where H' is metal oxide material having a refractive index greater than 1.7 and L' is a metal oxide material having a refractive index less than 1.7, and the total thickness of the anti-reflection coating is in the range of 700 nm to 1500 nm. The high refractive index material is selected from the group consisting of $ZrO_2$, $HfO_2$, $Ta_2O_5$, $Nb_2O_5$, $TiO_2$, $Y_2O_3$, $Sc_2O_3$, $Si_3N_4$, $SrTiO_3$ and $WO_3$. The low refractive index material is selected from the group consisting of $SiO_2$, F-doped $SiO_2$, and $Al_2O_3$, and fluorides $MgF_2$, $CaF_2$, $BaF_2$, $YbF_3$ and $YF_3$.

In an additional aspect the disclosure is directed to a method for making an integrated monolithic linear polarizer/attenuator element comprising:

providing a monolithic linear glass polarizer containing elongated metallic polarizing particles therein;

depositing on at least one surface of the glass polarizer a multilayer attenuating coating comprising at least two different coating materials having a refractive index greater than 2; and depositing a multilayer anti-reflection coating on top of the attenuation coating. the anti-reflection coating comprising at least one period H"L where H' is a high refractive index material having an index of refraction greater than 1.7 and L' is a low index of refraction material having and index of refraction less than or equal to 1.7 to thereby form wherein during the deposition of the attenuating coating and the anti-reflection coating, the temperature of the glass polarizer is below the temperature at which the metallic particles in the polarizing glass substrate will contract or respheroidize.

In the method, depositing an attenuation coating means depositing a multilayer coating of attenuation coating materials selected from the group consisting of silicon having a refractive index n≥3.4, and metal oxides and mixed-metal oxides having an index of refraction greater than 1.7; and depositing an anti-reflection coating, meaning depositing a plurality of periods H'L', where H' is metal oxide material having a refractive index greater than 1.7 and L' is a metal oxide material having a refractive index less than 1.7. The multilayer attenuation coating comprises an ITO layer having a thickness in the range of 250 nm to 600 nm, a $Cr_2O_3$ layer having a thickness in the range of 20 nm to 200 nm and at least one silicon layer having a thickness in the range of 30 nm to 700 nm; and the multilayer anti-reflection coating comprises a plurality of periods H'L', where H' is selected from the group consisting of $ZrO_2$, $HfO_2$, $Ta_2O_5$, $Nb_2O_5$, $TiO_2$, $Y_2O_3$, $Sc_2O_3$, $Si_3N_4$, $SrTiO_3$ and $WO_3$, and L' is selected from the group consisting of $SiO_2$, F-doped $SiO_2$, and $Al_2O_3$.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

We claim:

1. An integrated monolithic linear polarizer/attenuator element comprising a glass polarizer having polarizing particles therein, a multilayer light attenuating (LA) coating deposited on at least one surface of the glass polarizer and a multilayer anti-reflection (AR) coating deposited on top of the attenuation coating;

the LA coating comprising a plurality of periods of a high refractive index material H and a low refractive index material L, L being selected from the group consisting of metal oxides and mixed-metal oxides having a non-zero absorption and an index of refraction greater than 1.7, and H being silicon;

wherein the multilayer attenuation coating comprises at least one ITO layer having a thickness in the range of 250 nm to 600 nm, at least one Cr2O3 layer having a thickness in the range of 20 nm to 200 nm, and at least one silicon layer having a thickness in the range of 20 nm to 700 nm; and the AR coating comprising a plurality of periods H'L', where H' is a high refractive index material with n greater than 1.7 and L' is a low refractive index material with n less than or equal to 1.7;

the element having an attenuation in the range of greater than 0 dB to 3 db over the wavelength range of 1200-1700 nm; and the polarizing particles are selected from the group consisting of silver, copper and copper/cadmium.

2. The integrated monolithic linear polarizer/attenuator element according to claim 1, wherein the glass polarizer further comprises a noble metal selected from the group consisting of platinum, palladium, osmium, iridium, rhodium and ruthenium, said noble metal being present in an amount in the range of 0.0001 wt. % to 0.5 wt. % measured as zero valent metal.

3. The integrated monolithic linear polarizer/attenuator element according to claim 1, wherein the attenuation is in the range of 0.5 dB to 3 dB over the wavelength range of 1200-1700 nm.

4. The integrated monolithic linear polarizer/attenuator element according to claim 1, wherein the LA coating material L is selected from the group consisting of ITO, $Cr_2O_3$, ZnO, $HfO_2$, $Yb_2O_3$, $Nb_2O_3$ and $GeO_2$.

5. The integrated monolithic linear polarizer/attenuator element according to claim 4, wherein at least one LA coating material L has an index of refraction greater than 2.

6. The integrated monolithic linear polarizer/attenuator element according to claim 4, wherein at least one LA coating material L has an index of refraction greater than 2.2.

7. The integrated monolithic linear polarizer/attenuator element according to claim 1, wherein the AR high refractive index material H' is selected from the group consisting of $ZrO_2$, $HfO_2$, $Ta_2O_5$, $Nb_2O_5$, $TiO_2$, $Y_2O_3$, $Si_3N_4$, $SrTiO_3$ and $WO_3$.

8. The integrated monolithic linear polarizer/attenuator element according to claim 1, wherein the AR low refractive index material L' is selected from the group consisting of $SiO_2$, F-doped $SiO_2$, and $Al_2O_3$.

* * * * *

UNITED STATES PATENT AND TRADEMARK OFFICE
CERTIFICATE OF CORRECTION

PATENT NO. : 9,581,742 B2
APPLICATION NO. : 14/069789
DATED : February 28, 2017
INVENTOR(S) : Rachid Gafsi et al.

It is certified that error appears in the above-identified patent and that said Letters Patent is hereby corrected as shown below:

In the Claims

In Column 12, Line 48, in Claim 1, delete "Cr203" and insert -- $Cr_2O_3$ --.

In Column 13, Line 4, in Claim 3, delete "1200- 1700" and insert -- 1200-1700 --.

Signed and Sealed this
Twenty-second Day of November, 2022

*Katherine Kelly Vidal*

Katherine Kelly Vidal
*Director of the United States Patent and Trademark Office*